May 6, 1941.  J. O. BISHOP  2,240,739
MANIPULATOR
Filed March 8, 1939  4 Sheets-Sheet 1

Inventor
James O. Bishop
By Lyon & Lyon
Attorneys

May 6, 1941.  J. O. BISHOP  2,240,739
MANIPULATOR
Filed March 8, 1939   4 Sheets-Sheet 2
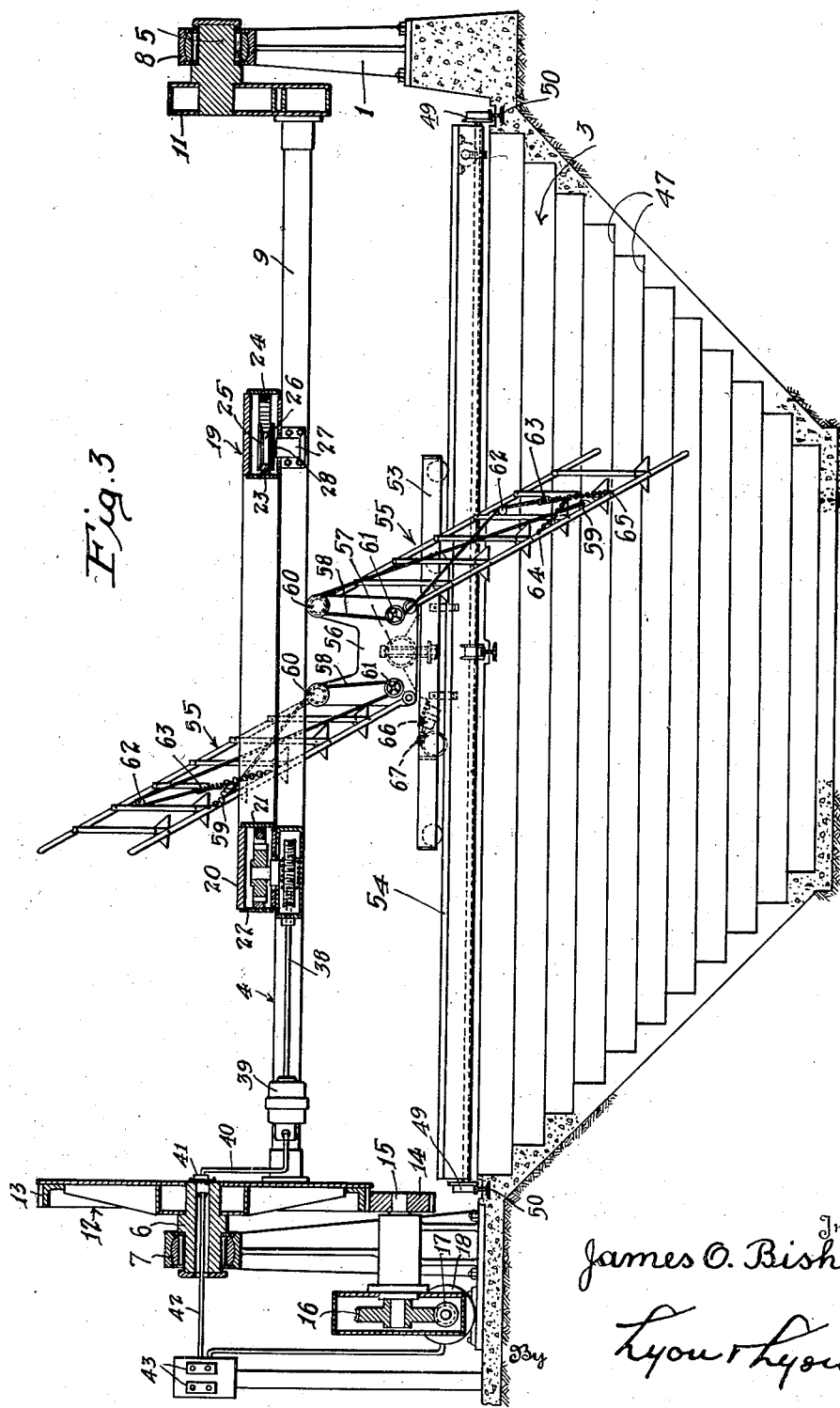

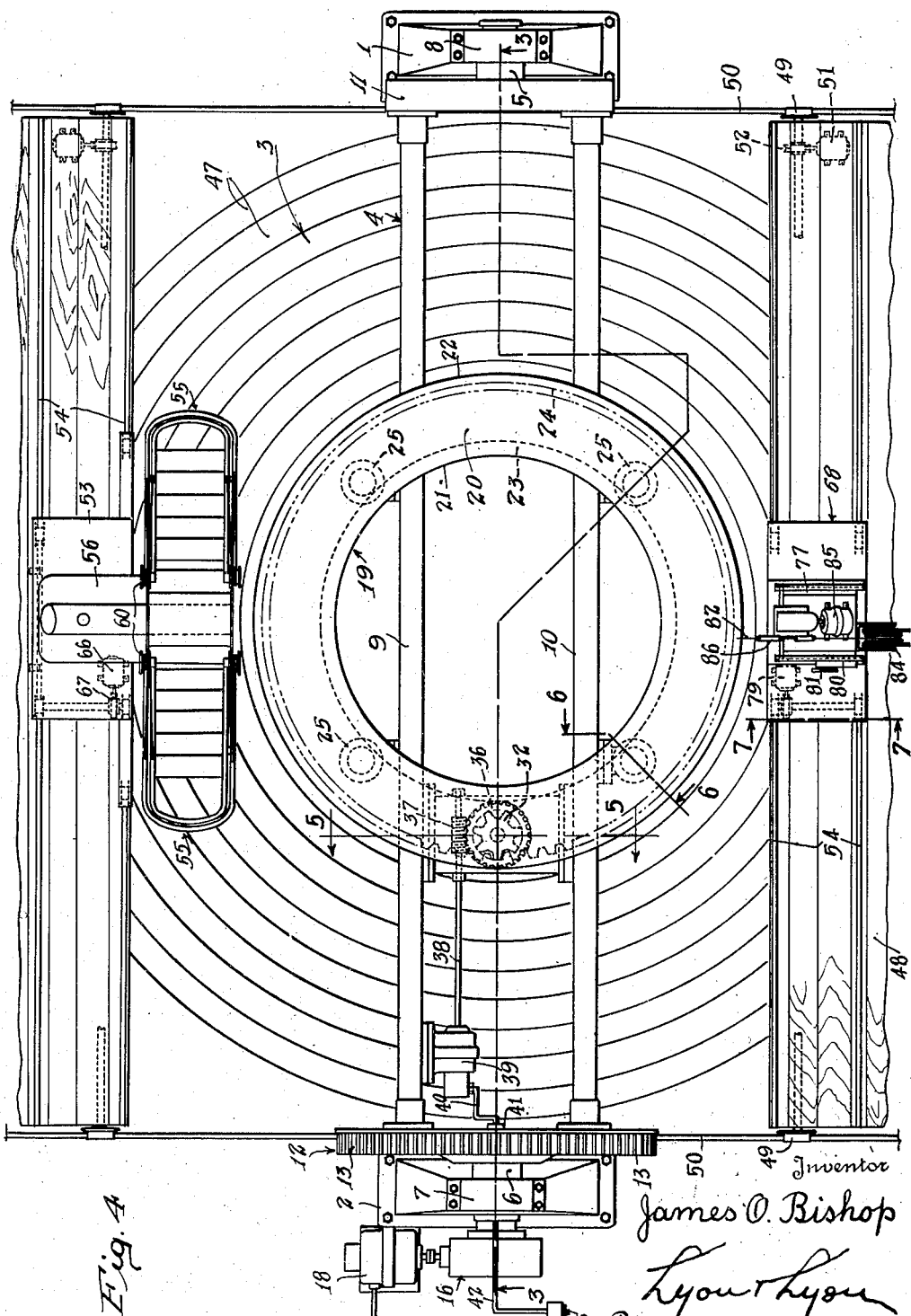

May 6, 1941.    J. O. BISHOP    2,240,739
MANIPULATOR
Filed March 8, 1939    4 Sheets-Sheet 4
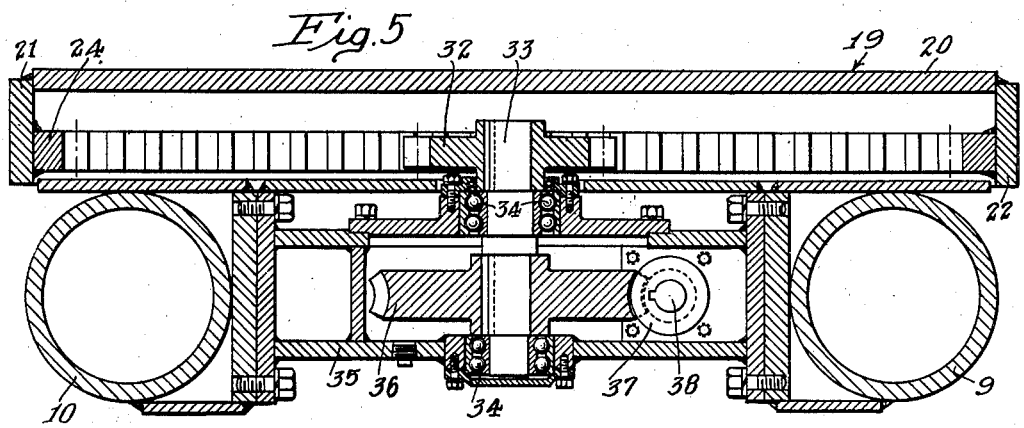
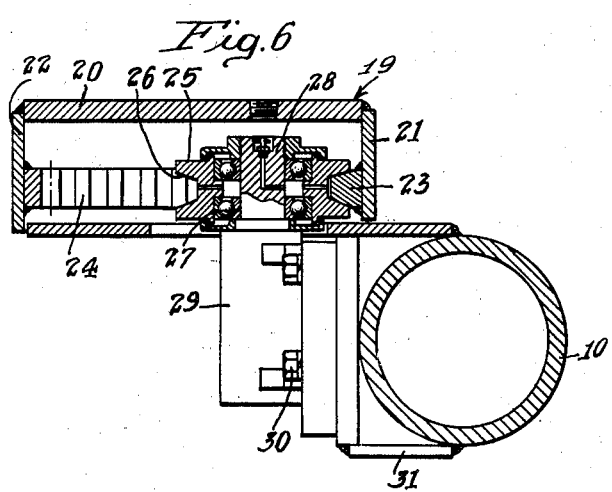
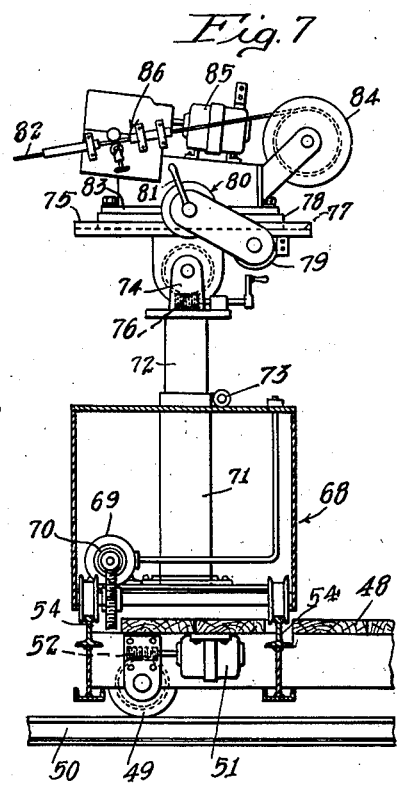
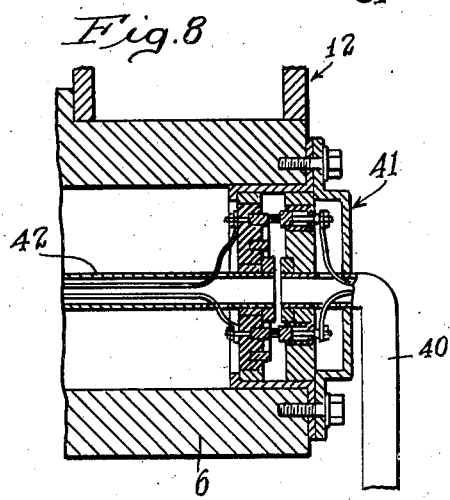
Inventor
James O. Bishop
By Lyon & Lyon
Attorneys Patented May 6, 1941

2,240,739

UNITED STATES PATENT OFFICE 2,240,739

MANIPULATOR

James O. Bishop, Torrance, Calif., assignor to The National Supply Company, Pittsburgh, Pa., a corporation of Pennsylvania Application March 8, 1939, Serial No. 260,604

9 Claims. (Cl. 113—59)

This invention relates to apparatus for supporting work upon which welding or other processing is to be performed, and is more particularly directed to a manipulator adapted to support relatively large structural work upon which welding is to be performed whereby the work may be supported in such position as to enable the welding or other processing thereof to be carried out in the most economical and efficient manner.

In the fabrication of very large structural objects, welding is resorted to frequently in order to secure the parts of such work together, and it is well known that such welding is most effectively and efficiently carried out where the surfaces to be welded together are so positioned as to enable the welding to be carried out from above or, as it is known in the art, to enable the formation of "downhand" welds where the welding material as it is rendered fluid is in a substantially horizontally supported position so that during the "puddling" of this welding material the same does not exhibit a tendency to flow away from the position of the weld.

In acetylene and electric welding, the best time and the most efficient weld can be accomplished where the metal is allowed to puddle in a channel, and this can only be done from the upper side of the work. In other words, it is difficult to make an overhead weld or a weld on the vertical face of a member.

It is therefore the principal object of this invention to provide a manipulator capable of conveniently and efficiently supporting large and bulky structural work in such manner as to enable that work to be rotated to such positions as may be required in order to carry out the greatest welding efficiency and which manipulator is so constructed as to maintain accessible all portions of the work.

Another object of this invention is to provide a manipulator capable of conveniently supporting large, heavy and bulky work in such a manner that it may be rotated through 360° in any direction and in which substantially all portions of the work are maintained accessible for welding.

Another object of this invention is to provide a manipulator including a ring turn-table which ring is universally mounted for rotary movement about its own axis and is mounted for rotation at an axis substantially at right angles thereto.

Another object of this invention is to provide a manipulator having a ring turn-table which is universally mounted over a pit and wherein adjustable means are provided of ladder formation which are mounted for movement upon a retractable floor which covers the pit.

Another object of this invention is to provide a manipulator having a turn-table which is operable in conjunction with automatic welding means mounted for longitudinal or transverse motion with respect to the center of said turntable.

Other objects and advantages of this invention it is believed will be apparent from the hereinafter contained description of the preferred embodiment thereof as illustrated in the accompanying drawings.

In the drawings:

Figure 3 is a sectional elevation taken substantially on the line 3—3 of Figure 4.

Figure 4 is a top plan view of the manipulator as illustrated in Figure 1.

Figure 5 is a sectional elevation taken substantially on the line 5—5 of Figure 4.

Figure 6 is a sectional elevation taken substantially on the line 6—6 of Figure 4.

Figure 7 is a sectional view taken substantially on the line 7—7 of Figure 4 illustrating the automatic welding rod feeding device embodied in my invention.

Figure 8 is a fragmental detail of the electric swivel connection embodied in my invention.

Figure 1:
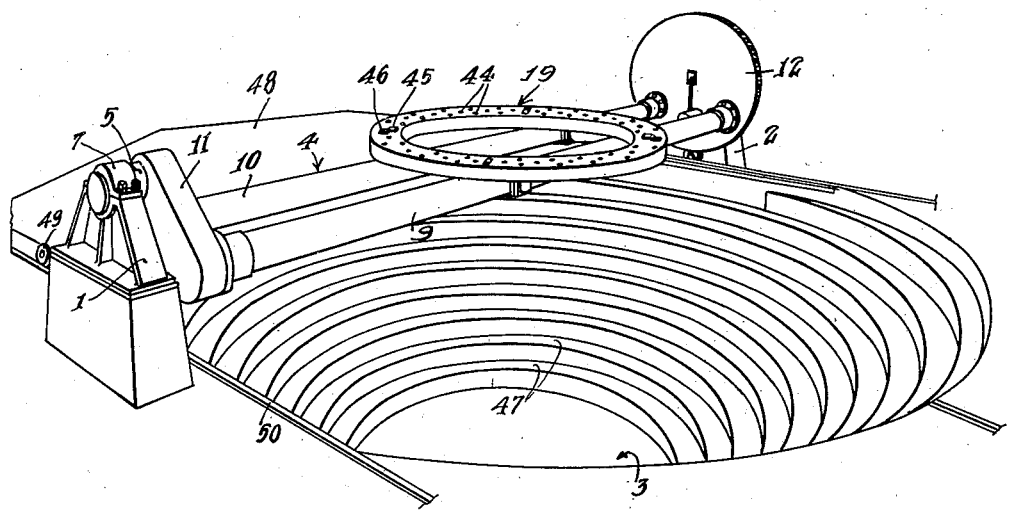
Figure 1 is a perspective view of the manipulator embodying my invention.

In the preferred embodiment of my invention as illustrated in the accompanying drawings, 1 and 2 indicate pedestals or end supports positioned on opposite sides of a pit 3. The end supports 1 and 2 are provided for rotatably supporting a cradle 4 so as to permit the cradle to rotate about a horizontal axis determined by the supporting trunnions 5 and 6 rotatably supported in self-aligning bearings 7 and 8 carried by the supports 1 and 2. The cradle 4 comprises a pair of spaced longitudinal beams 9 and 10 which are connected at their ends by end connectors 11 and 12. The end connector 12 as herein illustrated is of circular form and is provided with a gear 13 upon its periphery. The gear 13 is driven by a pinion 14 fixed on a shaft 15 carried by the pedestal 2. The shaft 15 is driven through the medium of a self-locking worm wheel 16 secured to the shaft 15 and meshing with the worm pinion 17. An electric motor 18 is provided for driving the worm pinion 17.

Means are provided for supporting the work comprising a turn-table 19 which is in the form of a ring. The large ring thus provided is so designed and constructed as to offer the minimum of obstruction to work positioned thereon so as to enable the greatest access possible to the work or to the positions thereof so that any part of the work or structure which is mounted upon the turn-table and requiring welding or fabrication can be reached either from above the turn-table 19 or up through the center of the ring forming the turn-table. Thus the turn-table comprises a flat annular ring 20 which forms the work receiving surface.

The ring 20 is provided with inner and outer depending annular walls 21 and 22 within which there is housed the means whereby the turn-table is rotatably supported and also the means provided for rotating the turn-table upon its axis and with reference to the cradle 4.

The inner annular wall 21 carries an annular rim 23 and the outer annular wall 22 carries an internal gear 24. In order to rotatably support the turn-table 19, there is provided a plurality of supporting rollers 25 each of which is provided with an annular supporting groove 26 adapted to fit and receive the annular rim 23. The rollers 25 are rotatably supported upon bearings 27 carried by the supporting trunnions 28. The trunnions 28 are formed as an extension of the supporting blocks 29 which are in turn bolted by means of bolts 30 to supports 31 secured in spaced relation to the members 9 and 10. The supporting bearings 27 are of the roller type and are mounted to accommodate upthrust, downthrust and radial loading.

The internal gear 24 is driven from a pinion 32 which is keyed to a shaft 33. The shaft 33 is in turn rotatably supported in spaced bearings 34 mounted within and supported by a housing 35 secured between supporting beams 9 and 10. Mounted within this housing is a worm wheel 36 of the self-locking type which is also keyed to the shaft 33 and meshes with the worm pinion 37 within the housing 35. The pinion 37 is keyed to a drive shaft 38, which drive shaft 38 extends from the housing 35 and is directly coupled with an electric motor 39.

As the motor is carried by the rotatable cradle 4, special provision is necessary for supplying electrical current. The source of electrical current to the motor is through a conduit 40, which conduit 40 extends through the trunnion 6 axially thereof. A swivel connection 41, details of which are indicated in Figure 8, is provided for establishing a rotatable connection between the conduit 40 and the extension 42 thereof. Any suitable source of electrical current is connected to the motors 18 and 39 and for the purpose as will hereinafter appear, there is provided in these circuits to the respective motors, spring switches 43 of a type well understood in the art, so that the switches are only maintained closed as long as pressure is maintained upon the push buttons thereof so that when the pressure is released, the current supplied to the motors 18 or 39 is disrupted, stopping the drives of the respective worm pinion and gear assemblies.

The annular ring 20 of the turn-table 19 is provided with a plurality of work locating holes 44 which are threaded so that work supporting clamps 45 may be secured thereto by means of bolts 46. It is by means of these clamps 45 that work such, for example, as the large structural frame W is secured to the turn-table.

Figure 2:
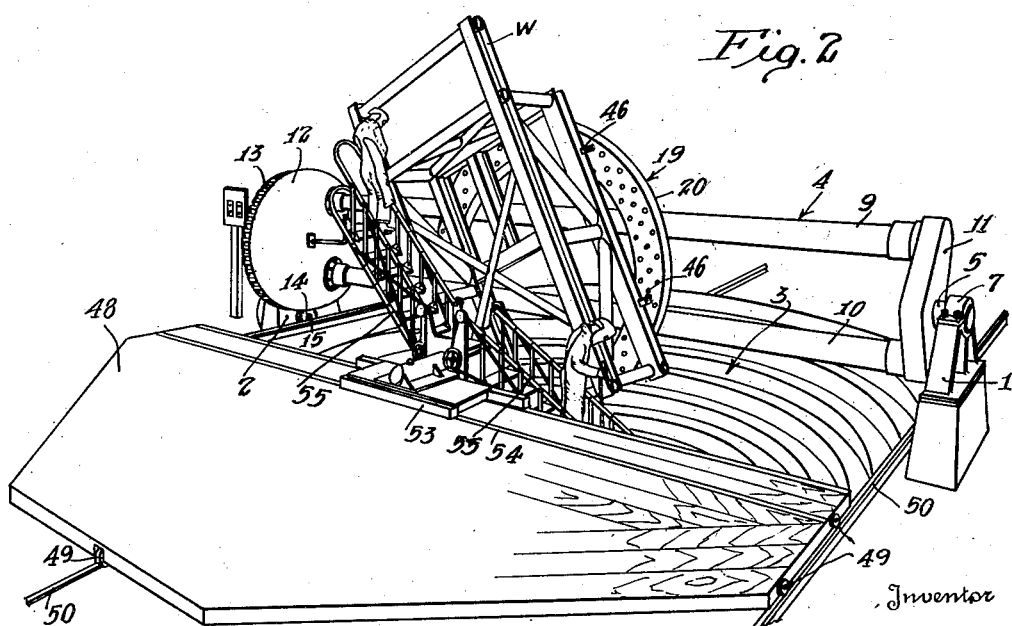
Figure 2 is another perspective view looking from the opposite side as compared with Figure 1 and illustrates work as supported upon the manipulator and workers in the act of welding the work as supported.

As will be apparent from Figure 2 of the drawings, the manner of supporting the turn-table 19 and the manner of drive of this turn-table is concealed below the work-supporting surface of the ring 20, thereby rendering available the greatest possible area permitting free access to the work W, either through the ring 20 or from the upper surface thereof, thereby enabling any part of the work requiring fabrication or welding to be reached, and as the work can thus be rotated to any position, it will be apparent that where welding is required, the work can be so positioned as to permit down-hand welds to be formed, insuring the greatest welding efficiency without requiring the relocation of the work for each different or series of different welding operations.

The pit 3 over which the turn-table 19 is supported is provided for the necessary clearance required for large pieces of work. In order that the pit may have utility other than merely providing the required clearance, the pit 3 is formed with downwardly sloping sides and is formed with steps 47 which may be used by the workers in order to permit the different portions of the work requiring fabrication to be reached.

In order to provide access to the work W as supported by the turn-table 19, movable floors 48 are provided adapted to be rolled into position to cover any desired portion of the pit 3. Each of the floors 48 is mounted upon supporting rollers 49, which rollers 49 may be run upon rails 50. The floors 48 may be moved to or from position as desired through any suitable means and because of their magnitude, I have preferred to provide power means for moving the floors 48 to and from position. Such power means may consist of an electric motor 51 carried by the floor 48 for driving a worm pinion 52. The pinion 52 meshes with a worm wheel secured to the shaft carrying the wheels 49.

In order to permit of access to the work W in any position, there are provided ladder cars 53 which are adapted to roll upon rails 54 mounted upon the floor 48. The ladders may be of any suitable or desirable form and are of such construction as will be well understood in the art as will permit of the same being raised or lowered to any position within 60° from the horizontal. These ladders 55 are supported upon a frame 56, which frame is pivotally supported by means of a pivot support 57 upon the cars 53 to permit the frame to be rotated with reference to the car 53, thus permitting the ladders to be moved to any desired position.

In order to maintain the ladders in selected position, a snubbing mechanism is provided for each ladder, which snubbing mechanism includes a pair of cables 58 each of which has one end fastened as indicated at 59. The cables 58 are then passed around stationary drums 60 and then pass over a hand-wheel 61 and over pulleys 62. The other end of each cable is secured to a tension spring 63. The spring 63 is attached to the middle of a chain whose ends are secured at 64 and 65. In operation either ladder may be raised manually simply by lifting it to the desired angle. This action of lifting the ladders is possible because in this operation the cable 58 is supplied to the snubbing drums 60 fast enough to furnish sufficient slack. Lowering of the ladders or downward pivotal movement of the ladders in other directions, however, is prevented by snubbing action of the cables 58 upon the drums 60. Therefore the ladders can be lowered only by rotating the hand-wheels 61. The action of rotating the hand-wheels 61 serves to relieve the tension around the drums 60 by supplying cable fast enough to prevent the snubbing action.

The ladder car 53 may be propelled along the rail by means of a motor 66 driving a worm unit 67.

A welding car 68 is also provided in accordance with my invention and is adapted to roll on either set of transverse rails 54. This welding car 68 is powered with a motor 69 which drives the car through a worm drive unit 70. Mounted upon the car 68 is a center air cylinder 71 providing a hoist for the welding equipment. The piston 72 of this hoist may be raised or lowered by means of this air cylinder and is free to rotate therein. A clamp 73 is provided to hold the piston in selected position. A bracket 74 is fixed on the top of the piston and serves to pivotally support the table 75. A worm and gear adjustment 76 is provided whereby the table 75 may be tilted from the horizontal.

The top of the table 75 may be provided with ways 77 upon which a carriage 78 is slidably supported. A motor 79 is mounted on the table 75 and serves to move the carriage 78 on the ways 77 through any suitable form of drive means. There is provided in this drive means a friction clutch indicated at 80 controlled through a clutch lever 81 which is utilized to "inch" the carriage into position. Any one of several devices may be bolted to the carriage 78. These devices may include a cutting torch, a flame hardening assembly, or as illustrated, an automatic feeding device for a welding rod 82. Any one of these devices, one of which I have chosen to illustrate, is particularly useful in conjunction with the table 19 when it is desired to generate a curve or to perform work at a uniform rate.

The automatic feeding device illustrated may be of any conventional type well understood in the art. The form illustrated includes a base 83 which is bolted to the carriage 78 and includes a spool 84 for the electric welding rod, a driving motor 85, and a guiding and tensioning unit 86. This device, as is well understood, operates to feed the welding rod 82 at a uniform rate. It will thus be obvious that if it is desired to weld in a curved line, the work piece W can be rotated by means of the turn-table 19 while the car 68 is held stationary and the welding rod is automatically deposited. It will also be obvious that when other curves are desired to be generated that the car 68 may be moved on the transverse rails 54 by means of the motor 69 or by moving the floor 48 by means of its motor 51 or both of these driving units may be utilized to generate the requisite curve. Thus a uniform weld may be obtained on the surface of the sphere or on any other surface of revolution.

It will be obvious from the foregoing that I have developed a manipulator for holding a work piece W so that it may be fabricated or welded and ordinarily in carrying out this process the work piece W consisting of a multiplicity of structural parts is first cut, fit and tacked together and is then lifted upon the turn-table. The work piece W is so positioned upon the turn-table 19 so that no welding zones on the under side are obstructed by the turn-table 19 or the beams 9 and 10. The work piece W is then clamped in position and may be then inspected to insure that the tack welds formed are sufficiently heavy to permit the work piece to be rotated with safety. In this type of work there are usually a number of horizontal or, in the vernacular, "down-hand" welds to be made when the work is first located. After these "down-hand" welds have been made, the work is then rotated in either or both planes to bring the welding zones into position so that the joints form a natural angular groove or V to permit the welding to be accomplished in a flat or "down-hand" position. It will be apparent from the foregoing that this procedure permits the operator to use the largest practical electrode in carrying out the welding operations. This may be looked upon as the ideal method of welding, not only because of the resultant economy in heat and electrode size, but the ease by which equal and complete fusion may be produced on both of the angles. Several welds in one position may be completed at the same time as is, for example, illustrated in Figure 2 where there are shown two welders operating simultaneously to produce down-hand welds. After these down-hand welds are completed, the operators then step away, remove the rolling floor 48, and rotate the work to a new position and proceed as before. The convenience of this procedure contributes materially to frequent turns and welding at various locations, therefore lessening the concentration of stresses with resultant distortion caused by the concentration of the welds.

Having fully described my invention, it is to be understood that I do not wish to be limited to the details herein set forth, but my invention is of the full scope of the appended claims.

I claim:

1. In a manipulator, the combination of a pair of spaced supports, a pit intermediate said supports, a cradle spanning said pit including a plurality of longitudinal beams joined by a cross member at each end, bearing means whereby said cross members are rotatably mounted on said supports, an annular ring located above said pit and disposed intermediate said supports, a plurality of spaced rollers each rotatably mounted on said cradle for rotation in a common plane, said rollers cooperating to support said annular ring for rotation about an axis substantially at right angles to the axis of rotation of the cradle, means carried on the cradle adapted to rotate said annular ring, and means acting on one of said cross members adapted to rotate said cradle.

2. In a manipulator, the combination of a pair of spaced supports, a pit intermediate said supports, a cradle spanning said pit including a plurality of longitudinal beams joined by a cross member at each end, bearing means whereby said cross members are rotatably mounted on said supports, a turn-table located above said pit and disposed intermediate said supports, a laterally extending flange on said turn-table, a pair of grooved rollers rotatably supported in spaced relation upon each of said longitudinal beams, said rollers being positioned for rotation in a common plane, the rollers cooperating with said flange to support the turn-table about an axis substantially at right angles to the axis of rotation of the cradle, means carried on the cradle adapted to rotate said turn-table, and means acting on one of said cross members adapted to rotate said cradle.

3. In a manipulator, the combination of a pit, a pair of spaced supports positioned on opposite sides of said pit, a cradle spanning said pit, said cradle including a pair of parallel beams joined by a cross-member at each end, bearing means whereby said cross-members are rotatably mounted on said supports, an annular ring located above said pit and disposed centrally of said parallel beams, the outer diameter of the ring being substantially greater than the distance between said beams, a plurality of spaced rollers each rotatably mounted on said cradle, said rollers cooperating to support said annular ring about an axis substantially at right angles to the axis of rotation of the cradle, a gear on said annular ring, a pinion rotatably mounted on said cradle adapted to mesh with said gear, means carried by the cradle adapted to rotate said pinion, and means adjacent one of said supports adapted to rotate said cradle.

4. In a manipulator, the combination of a pair of spaced supports, a cradle rotatably mounted between said supports, a turn-table rotatably mounted centrally of said cradle, said turn-table comprising an annular ring having a laterally extending flange associated therewith, a plurality of grooved rollers supported in spaced relation upon said cradle and adapted for rotation in a common plane, the rollers cooperating with said flange to support the turn-table about an axis disposed at an angle to the axis of rotation of the cradle, an internal gear secured to the said turn-table, drive means on said cradle including a pinion adapted to rotate said internal gear, and independent drive means adapted to rotate said cradle.

5. In a manipulator, the combination of a pair of spaced supports, a cradle including a plurality of longitudinal beams joined by a cross-member at each end, aligned bearings whereby said cross-members are rotatably mounted on said supports, an annular ring disposed intermediate said supports, a plurality of spaced rollers each rotatably mounted on said cradle, said rollers cooperating to support said annular ring about an axis disposed at an angle to the axis of rotation of the cradle, drive means carried on the cradle adapted to rotate said annular ring, an element extending axially through one of said bearings and adapted to supply energy to said drive means, and power means acting on one of said cross-members adapted to rotate said cradle.

6. In a manipulator, the combination of a pair of spaced supports, a pit intermediate said supports, a cradle spanning said pit and rotatably mounted on said supports, an annular ring located above said pit and disposed intermediate said supports, a plurality of spaced rollers each rotatably mounted on said cradle, said rollers cooperating to support said annular ring about an axis substantially at right angles to the axis of rotation of the cradle, means carried on the cradle adapted to rotate said annular ring, means adjacent one of said supports adapted to rotate said cradle, a movable floor adapted to cover a portion of said pit, and a welding device adapted to deposit weld metal on a work piece carried on said annular ring, said welding device being arranged for movement on said flood in a direction at right angles to the direction of movement of the floor.

7. In a manipulator, the combination of a pair of spaced supports, a pit intermediate said supports, a cradle spanning said pit and rotatably mounted on said supports, a turn-table located above said pit and rotatably mounted upon said cradle, means carried on the cradle adapted to rotate said turn-table, means adjacent one of said supports adapted to rotate said cradle, a movable floor adapted to cover a portion of said pit, a pair of rails on said floor disposed parallel to the axis of rotation of the cradle, and a welding device adapted to deposit weld metal on a work piece carried on said turn-table, said welding device being adapted for movement along said rails.

8. In a manipulator, the combination of a pair of spaced supports, a cradle rotatably mounted between said supports, an annular turn-table rotatably mounted on said cradle, said turn-table including a ring to which work may be secured and having a large unobstructed center opening through which access to the work may be had, inner and outer depending annular walls secured to said ring and cooperating therewith to form an annular enclosure, a plurality of rollers supported in spaced relation upon said cradle and positioned within said enclosure, cooperating means associated with the rollers and one of said depending annular walls adapted to support the turn-table about an axis disposed at an angle to the axis of rotation of the cradle. a gear associated with the other of said depending annular walls, drive means on said cradle including a pinion adapted to rotate said gear, and independent drive means adapted to rotate said cradle.

9. In a manipulator, the combination of a pair of spaced supports, a cradle rotatably mounted between said supports, an annular turn-table rotatably mounted on said cradle, said turn-table including a ring to which work may be secured and having a large unobstructed center opening through which access to the work may be had, inner and outer depending annular walls secured to said ring and cooperating therewith to form an annular enclosure, a plurality of rollers supported in spaced relation upon said cradle and positioned within said enclosure, cooperating means associated with the rollers and the inner depending annular wall adapted to support the turn-table about an axis disposed at an angle to the axis of rotation of the cradle, an internal gear associated with the other depending annular wall, drive means on said cradle including a pinion positioned within said enclosure and adapted to rotate said gear, and independent drive means adapted to rotate said cradle.

JAMES O. BISHOP.